United States Patent [19]

Walsh

[11] 4,419,328

[45] Dec. 6, 1983

[54] CONTROLLED FLUIDIZED BED REACTOR FOR TESTING CATALYSTS

[75] Inventor: Dennis E. Walsh, Richboro, Pa.

[73] Assignee: Mobil Oil Corporation, New York, N.Y.

[21] Appl. No.: 288,546

[22] Filed: Jul. 30, 1981

[51] Int. Cl.³ .......................... G01N 31/12; B01J 8/18
[52] U.S. Cl. ...................................... 422/62; 422/78; 422/80; 422/111; 422/130; 422/144; 436/37; 436/55; 436/133
[58] Field of Search ............... 23/230 PC; 422/62, 78, 422/80, 139–147, 111, 116, 130; 208/DIG. 1, 163; 436/37, 55, 133

[56] References Cited

U.S. PATENT DOCUMENTS

| 2,392,957 | 1/1946 | Thomas | 208/163 |
| 3,769,203 | 10/1973 | Lee et al. | 422/111 |
| 4,160,806 | 2/1979 | Long et al. | 422/111 |
| 4,209,490 | 6/1980 | Duncan et al. | 422/130 |
| 4,318,708 | 3/1982 | Hogberg | 23/230 R |

FOREIGN PATENT DOCUMENTS 611667  6/1978  U.S.S.R. .............................. 422/130

Primary Examiner—Michael S. Marcus
Attorney, Agent, or Firm—Alexander J. McKillop; Michael G. Gilman; Howard M. Flournoy

[57] ABSTRACT

Apparatus for investigating the performance of a catalyst used in a catalytic cracking process includes a single fluidized bed reactor charged with the catalyst to be investigated and a digital computer which controls the supply of hydrocarbon feed stock and regenerating air in successive and repeated catalytic cracking intervals and catalyst regeneration intervals.

9 Claims, 2 Drawing Figures

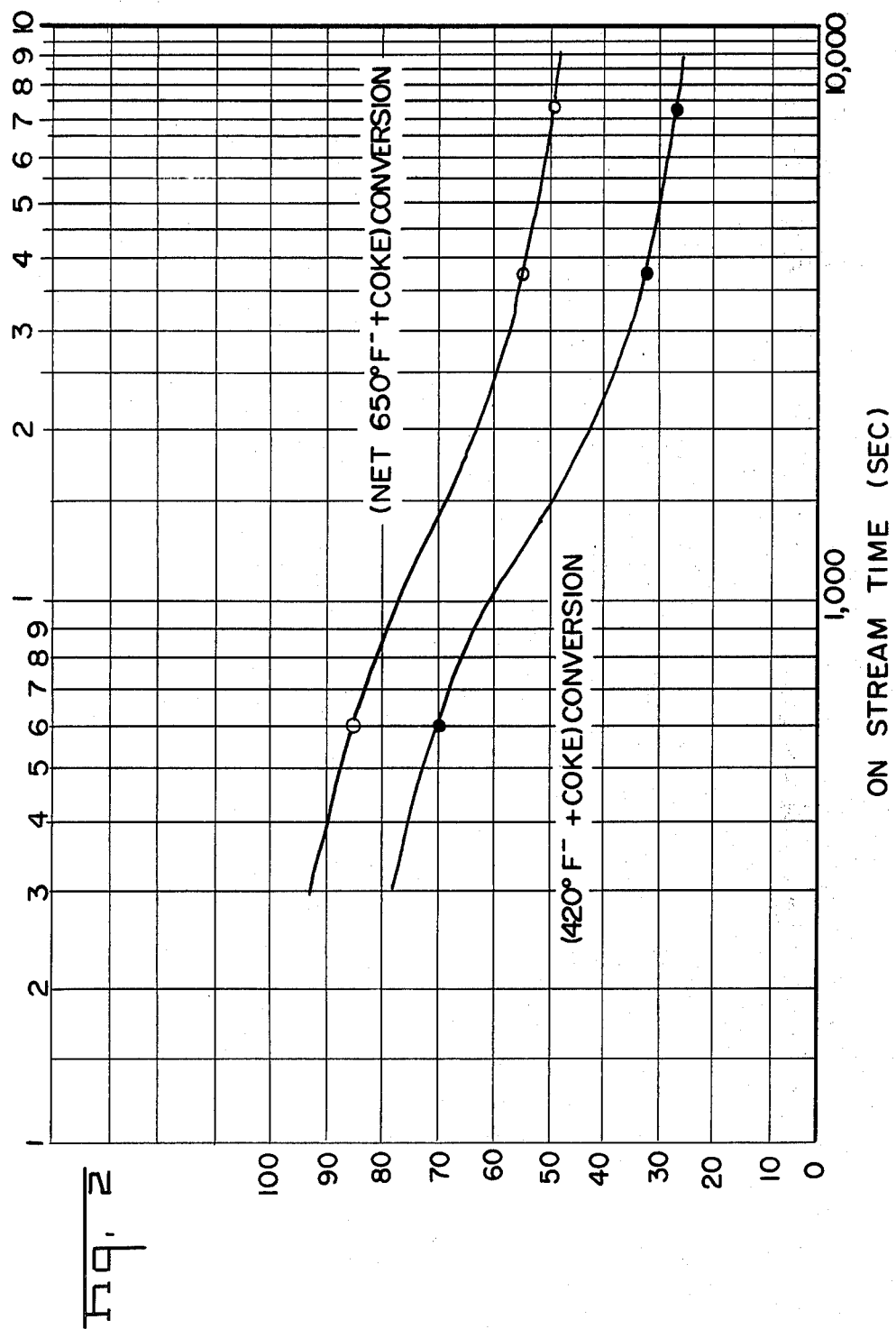

CONTROLLED FLUIDIZED BED REACTOR FOR TESTING CATALYSTS

BACKGROUND

The present invention relates to catalytic cracking processes for the conversion of a stream of hydrocarbon feed stock under catalytic cracking conditions and more particularly to the testing of catalysts for use in such processes.

In catalytic cracking, a stream of hydrocarbon feed stock is contacted with an active catalyst in a reactor maintained under catalytic cracking conditions with the reaction products being removed from the reactor. The catalyst in the reactor becomes contaminated by the deposition of coke and is removed from the reactor for regeneration. The coke is burned off the spent catalyst in a regenerator by blowing air through the regenerator. The regenerated catalyst is then fed back to the reactor.

The catalytic cracking processes in common use today are described in 1980 REFINING PROCESSES HANDBOOK, reprinted from September, 1980 issue of HYDROCARBON PROCESSING, pp. 145–152. Most of the catalytic cracking processes in use today have an entrained bed reactor wherein feed stock and regenerated catalyst are continuously mixed and flow through the reactor which provides the necessary residence time for cracking. The product is separated from the contaminated catalyst which is then transferred to the regenerator.

Extensive study has been conducted of the properties of catalysts for use in such processes. It is desirable to determine such properties as catalyst aging with time and conversion efficiency under various operating conditions. Small fixed bed reactors are commonly used to screen catalysts. However, fixed bed reactors have certain disadvantages, including the difficulty of regenerating the catalyst in a fixed bed. If the catalyst is quickly burned, local hot spots may be produced which damage the catalysts. If the catalyst is regenerated carefully, it takes a long time to perform the regeneration. Also, fixed bed reactors do not provide the same dynamic operting conditions as entrained bed reactors, and hence do not provide good indications of the performance of the catalyst in an actual entrained bed reaction. In U.S. Pat. No. 4,028,430-Stine, et al, a plurality of fixed bed reactors are connected and operated in a manner which simulates a moving catalyst bed. A suitable programming device charges the points of inlet and outlet into and from the reactor including a reactivation stream of catalysts. This is a relatively large unit which is not suitable for small scale laboratory testing.

The optimum way of testing catalysts would be to provide a scaled-down version of the actual operating reactors and regenerators. However, the actual apparatus is complicated. Pilot plants have been built to simulate the operation of larger catalytic processes. However, it is desirable to provide even smaller apparatus for use in the laboratory to test catalyst properties. One approach to the laboratory screening of catalysts is to provide an entrained bed reactor wherein a charge of feed stock and a charge of catalyst are mixed and fed to a reactor which provides the desired residence time typical of the actual process being simulated. Then the product and contaminated catalyst are fed to a disengagement vessel. Under laboratory conditions, such a run takes a very short time, for example, on the order of ten minutes. Then the catalyst is removed from the disengagement vessel and regenerated. This is time-consuming and does not provide desired information about catalyst performance under extended operating conditions where the catalyst is being continuously supplied to a regenerator and then fed back to the reactor.

Another approach to laboratory testing is the simulation of catalytic cracking processes on general purpose digital computers. U.S. Pat. No. 4,187,548—Gross, et al is an example of digital computer simulation of a catalytic cracking process. While such simulations provide good predictions of the product yield under known operating conditions and with known catalysts, they are not as useful for screening new catalysts under different operating conditions.

It is an object of the present invention to provide apparatus for investigating the performance of catalysts used in entrained bed catalytic cracking process.

RELATED APPLICATIONS

Co-pending application Ser. No. 288,316, Walsh, filed concurrently herewith, discloses and claims a catalytic cracking process using a reactor operated in cyclic intervals of cracking and in situ regeneration.

SUMMARY OF THE INVENTION

In accordance with the present invention, a single fluidized bed reactor is controlled in successive cyclic intervals of cracking and in situ catalyst regeneration in the reactor. More specifically, a digital computer controls the supply of hydrocarbon feed stock and regenerating air, oxygen enriched if desired, to the reactor. The feed stock is supplied to the reactor during cracking intervals while the regenerating air is turned off; regenerating air is supplied to the reactor during successive regeneration intervals when the flow of feed stock is turned off. The apparatus of this invention has the advantageous capability of testing catalysts for extended periods of time under conditions which closely simulate conditions in an entrained bed reactor.

The invention has advantages over fixed bed reactors in that regeneration can be carried out in situ much more quickly. The fluidized bed distributes the heat evenly during regeneration so that there are no hot spots. Therefore, higher partial pressure of oxygen may be used in the regeneration gases. ALso, the present invention provides operating conditions more closely simulating those in an entrained bed reactor over long periods of time.

The present invention has advantages over prior laboratory entrained bed type testing apparatus in that the catalyst is cyclically regenerated in situ in the reactor. There is no need to remove the catalyst from the vessel to regenerate it. The present invention has the advantage of simulating the operating condition of an actual operating entrained bed catalytic cracking process without the complexity of scaling down all of the actual operating components such as the reactor, regenerator, risers, and so on.

In accordance with another aspect of the invention, the concentrations of $CO$ and $CO_2$ in the reactor are monitored during regeneration intervals. These concentrations are recorded and the digital computer determines the amount of coke which has been deposited on the catalyst. In accordance with the present invention, the frequency of the monitoring and recording of the CO and $CO_2$ concentrations is increased as the concentration increases.

In accordance with another aspect of this invention, the reaction products are collected during catalytic cracking intervals so that the reaction products can be determined over extended use of the catalysts. These reaction products are analyzed and material balances are obtained.

The foregoing and other objects, features and advantages of the invention will be better understood from the following more detailed description and appended claims.

SHORT DESCRIPTION OF THE DRAWINGS

FIG. 1 shows the apparatus of the present invention;
FIG. 2 shows a plot of cumulative conversion data vs. time on stream for continuous operation.

DESCRIPTION OF THE PREFERRED EMBODIMENT

Figure 1:
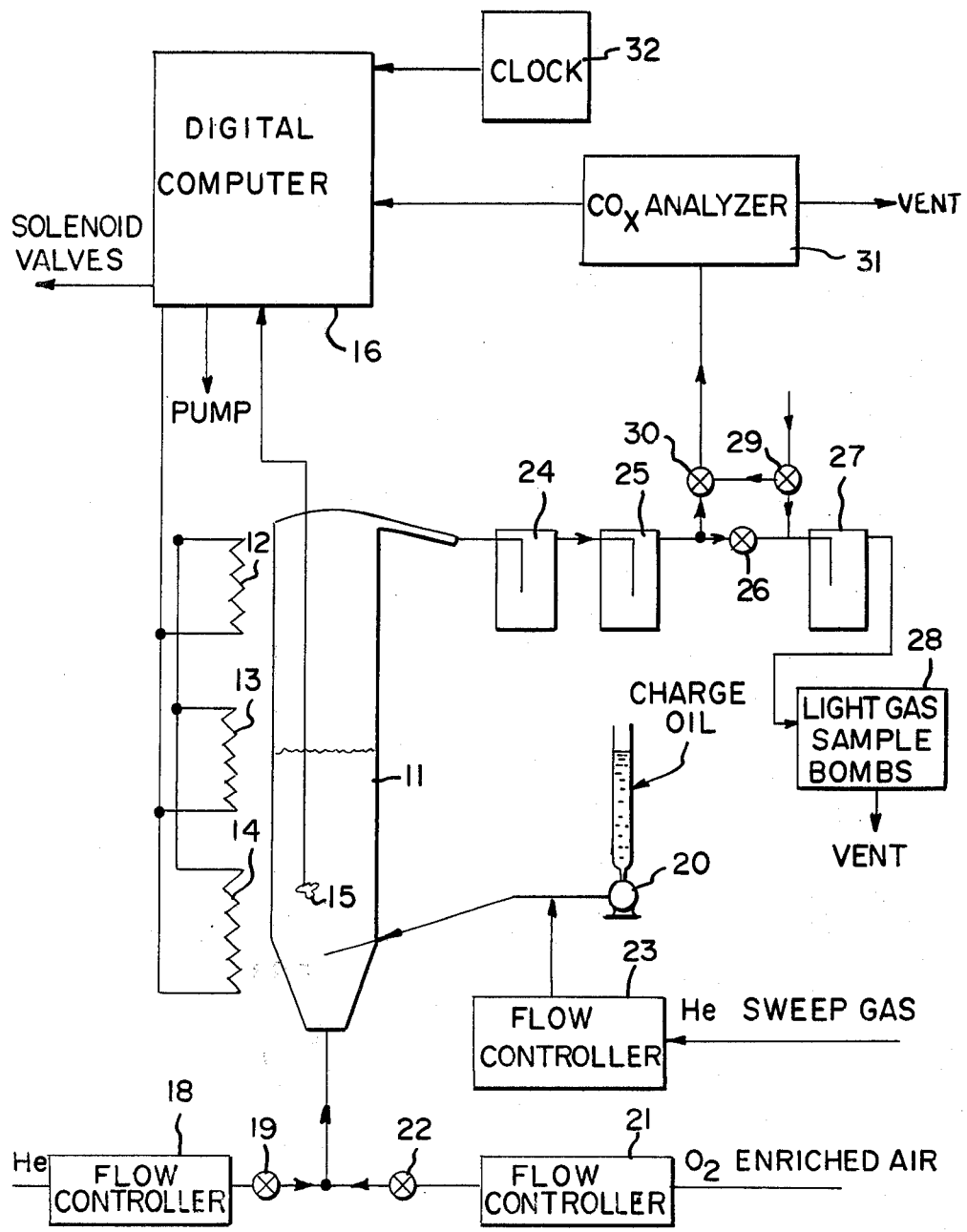

The present invention includes a single fluidized bed reactor 11 which is charged with the catalyst to be investigated. The reactor vessel is enclosed in a three zone furnace including the heaters 12, 13, and 14. A thermocouple 15 provides an indication of temperature to the digital computer 16 which maintains the temperature in the fluidized bed of the reactor at the desired level. The other two zones are maintained at the same temperature to avoid possible hot zones at the top and to ensure that the entire reactor vessel is isothermal. The bottom of the reactor vessel is charged with catalyst which is fluidized by vaporized or feed, reaction products, and supplementary inert gas, for example, helium, the latter being supplied through flow controller 18 and solenoid valve 19. Inert sweep gas, for example Helium, may be supplied to the oil feed line through the flow controller 23.

During cracking intervals, hydrocarbon feed stock is supplied to the reactor 11 by the pump 20 which is cyclically controlled by the digital computer 16.

During regeneration intervals, air, oxygen enriched if desired, is supplied to the reactor through flow controller 21 and solenoid valve 22.

In order to monitor the reaction product yields from the reactor and the coke deposited on the catalyst, the reaction gases are supplied to an ambient trap 24 and a dry ice trap 25. During cracking intervals, the solenoid valve 26 supplies reaction products to the liquid nitrogen trap 27 and the light gas sample bombs 28.

During regeneration intervals, the solenoid valve 29 supplies helium sweep gas to these traps. During regeneration intervals, the solenoid valve 30 is open to supply combustion gases to the CO, $CO_2$ analyzer 31.

To illustrate the operation, apparatus actions during a cycle will be described. The computer 16 which drives the experiment allows selection of the cracking time (usually 10 minutes or less) as well as stripping time for removal of sorbed hydrocarbons prior to catalyst regeneration (usually 5 minutes).

At the beginning of a cycle, the computer 16 opens solenoid valve 19 to allow He fluidizing gas to enter the reactor. Pump 20 is actuated to admit feedstock to the unit. Products exit through the traps 24, 25, and 27, valve 26 being open. Two way valves 29 and 30 are closed to the passage of product vapors, but open to a flow of He which sweeps the gas analyzer 31 as a "zero gas". Analyzer 31 is a non-dispersive infrared gas analyzer (NDIR). When, via monitoring the digital clock 32, the computer 16 determines that the pumping interval has been completed, it shuts off the pump 20 and maintains He flow through the reactor and traps for the prescribed amount of stripping time. At the end of this period, valve 19 is closed and 22 is opened to admit air, oxygen enriched if desired, for combustion of coke on catalyst which occurs readily at the reactor temperature maintained for a gas oil cracking reaction (~500° C.).

Computer 16 has the capability of controlling the exotherm associated with the coke burnoff by monitoring the bed temperature and replacing air flow with He flow when that temperature exceeds a prescribed value. After the bed cools sufficiently, the air is readmitted. In actual operation, the exotherm was fairly mild ($\leq 35°$ C.) and uniform throughout the fluid bed and thus no control was necessary. Alternatively, the digital computer can be used to control the heaters as is indicated in the drawing.

Simultaneously, valve 26 is closed and valves 29 and 30 are switched to their alternate positions. Thus, combustion gases are diverted from the dry ice trap 25 into the analyzer 31 while the He "zero gas" sweeps the liquid nitrogen trap 27 to prevent condensation of ambient air. The computer 16 monitors the evolution of CO and $CO_2$ recording on-line values which are stored on a tape cartridge. The frequency of analyzer readings increases as the $CO_x$ concentration increases in the combustion gas stream. These $CO_x$ data are retrieved after the run and used in conjunction with another program to calculate coke produced during the experiment. When the concentrations of both CO and $CO_2$ in the combustion gases fall below a prescribed limiting value, the catalyst is considered to be "clean". Valve 22 is closed and valve 19 opened so that He fluidizing gas may sweep the oxidizing gas out of the reactor 11 for a period of about 1 minute. The computer 16 then places all other valves back in their initial start-of-cycle position and actuates the pump 20 to begin a new cycle.

As an example of the results obtained, a 650° F.+ sour heavy gas oil (approximately 3.5% 650° F.+) was used as the charge. The properties of this gas oil are:

| PROPERTY OF 650° F.+ SOUR HEAVY GAS OIL | |
|---|---|
| C (wt. %) | 85.65 |
| H (wt. %) | 12.13 |
| O (wt. %) | 0.30 |
| N (wt. %) | 0.09 |
| S (wt. %) | 2.15 |
| Ash (wt. %) | 0.01 |
| Ni ppm | 0.5 |
| V ppm | 0.5 |
| CCR (wt. %) | 0.44 |
| 420° F.− (wt. %) | 0.0 |
| 420–650° F. (wt. %) | 3.5 |
| 650–850° F. (wt. %) | 52.2 |
| 850° F. (wt. %) | 44.3 |

Approximately 35 cc of equilibrium Filtrol 75-F catalyst, sized to 60–80 mesh, was charged to the vycor reactor 11 (58 cm long × 3.5 cm ID) along with 15 cc of 80–120 mesh vycor to help maintain smooth fluidization. He fluidizing gas enters through a frit at the base of the tapered section of the reactor bottom. A small flow of He also sweeps through the feed oil inlet line. The total He flow (850 cc/min.) plus the vapor phase reactant and product hydrocarbons maintain the bed in vigorous motion which, in turn, insures good temperature control. In the exemplary apparatus the digital computer 16 was a commercially available unit. The programming required will be apparent from the foregoing and from the user's manuals for the particular computer which is used.

Experiments were carried out at 505°+5° C. and atmospheric pressure. Weight hourly space velocity was 2.2. During a 10 minute pumping interval, the catalyst to oil ratio (wt/wt) was 2.7.

Accumulated gas products were analyzed via Gas Chromatography (GC). Accumulated liquid products were vacuum flashed to separate any 1000° F.+ material from 1000° F.− and the latter were subject to GC simulated distillation. Coke was determined as noted above. Elemental analyses were performed. Total material balances were generally 95% or greater and results reported have been normalized to a no loss basis. (Net 650° F.−+coke) conversion was defined as:

$$\frac{\text{Gas + Net 650° F.}^- \text{ liquids + coke}}{650° \text{ F.}^+ \text{ charge}}$$

results for these experiments are presented in Table 2 and FIG. 2. Two points emerge from consideration of these data.

In the continuous run, the activity declines with time on stream and produces the cumulative conversion data shown, a plot of which (FIG. 2) is typical of non-regenerative catalytic cracking operation. Cumulative conversion at any time is the accumulation of all the converted materials from the beginning of the run to the time in question.

The conversion, selectivities and G/D ratios resulting from analyses of the total accumulated products obtained from the cyclic run are very similar to those obtained from the first 10 min. of the continuous run. Thus, cyclic regeneration restores the catalyst activity, and performance from one 10 min. pumping interval to another is fairly equivalent. 36% more overall (Net 650° F.−+coke) conversion is obtained in the cyclic run and cumulative product selectivities, compared at the end of both runs, are greatly different.

TABLE 2

650° F.+ Sour Heavy Gas Oil Cracking Over Commercial 75-F Equilibrium Cracking Catalyst Temperature, 505° C.; Pressure, 1 atm.

| | CONTINUOUS RUN | | | | CYCLIC RUN | |
|---|---|---|---|---|---|---|
| Run No. | | | 24 | Run No. | | 21 |
| WHSV[a] | | | 2.2 | WHSV[a] | | 2.2 |
| Cracking Time (min.) | | 10 | 60 | 120 | Cracking Time (min.) | 10 |
| Cumulative Cat/Oil (wt/wt)[b] | | 2.7 | 0.4 | 0.2 | Cat/Oil (wt/wt)[b] | 2.7 |
| Products (wt. %) | Charge | | Cumulative | | Products (wt. %) | Charge |
| $C_3^-$ | — | 8.3 | 2.5 | 2.4 | $C_3^-$ | — | 6.0 |
| $C_4$'s | — | 4.8 | 1.3 | 1.1 | $C_4$'s | — | 4.3 |
| $C_5$-420° F. | — | 52.6 | 28.7 | 23.5 | $C_5$-420° F. | — | 55.7 |
| 420–650° F. | 3.5 | 16.2 | 23.0 | 22.5 | 420–650° F. | 3.5 | 17.6 |
| 650–850° F. | 52.2 | 11.5 | 36.4 | 39.2 | 650–850° F. | 52.2 | 11.3 |
| 850° F.+ | 44.3 | 2.3 | 6.7 | 10.4 | 850° F.+ | 44.3 | 2.8 |
| Coke | — | $(4.3)^e$ | $(1.4)^e$ | 0.9 | Coke | — | 2.3 |
| (Net 650° F.− + coke) Conversion (wt. %)[c] | — | 85.7 | 55.3 | 48.6 | (Net 650° F.− + coke) Conversion (wt. %)[c] | — | 85.4 |
| (420° F.− + coke) Conversion (wt. %) (cumulative)[d] | — | 70.0 | 33.9 | 27.9 | (420° F.− + coke) Conversion (wt. %)[d] | — | 68.3 |
| Selectivities[f] | | | | | Selectivities[f] | | |
| Gas | | 15.8 | 7.1 | 7.5 | Gas | | 12.5 |
| Coke | | $(5.2)^e$ | $(2.6)^e$ | 1.9 | Coke | | 2.8 |
| $C_5$-420° F. (G) | | 63.6 | 53.8 | 50.1 | $C_5$-420° F. (G) | | 67.6 |
| 420–650° F. (D) | | 15.3 | 36.5 | 40.5 | 420–650° F. (D) | | 17.1 |
| G/D | | 4.2 | 1.5 | 1.2 | G/D | | 4.0 |

[a] Based on weight of catalyst in the bed.
[b] Weight of catalyst divided by weight of oil pumped prior to regeneration.
[c] (Net 650° F.− liquids + gas + coke)/(650° F.+ charge).
[d] (420° F.− liquids + gas + coke)/(gas oil charged).
[e] Numbers in parentheses are estimated values due to the continuous, non-regenerative nature of the run. Coke yield and selectivity shown at run's end are experimental values.
[f] Based on (net 650° F.− + coke) conversion.

(420° F.−+coke) conversion, similarly defined, is also presented:

$$\frac{\text{Gas + 420° F.}^- \text{ liquids + coke}}{\text{Gas oil charged}}$$

To verify that typical fluid catalytic cracking results could be obtained in the unit, both continuous and cyclic modes of operation were performed. In both cases, the same total amounts of oil were processed under the same conditions, but in one case the catalyst was regenerated every 10 minutes (run 21) while in the other pumping was continuous and coke was removed only upon completion of the run (run 24). Conditions and While a particular embodiment of the invention has been shown and described, modifications are within the true spirit and scope of the invention. The appended claims are, therefore, intended to cover all such modifications.

What is claimed is:

1. Apparatus for investigating the performance of a catalyst used in a continuous catalytic cracking process for the conversion of a stream of hydrocarbon feed stock wherein said stream is contacted with an active catalyst in a reactor maintained under catalytic cracking conditions to provide reaction products which are removed from said reactor, the catalyst in said reacator becoming contaminated by the deposition of coke thereon, said apparatus comprising:

a single fluidized bed laboratory scale reactor charged with the catalyst to be investigated;

means for supplying hydrocarbon feed stock to said reactor;

means for supplying air to said reactor for regeneration of said catalyst;

means for controlling said means for supplying in successive and repeated cyclic catalyst cracking intervals and cyclic catalyst regeneration intervals;

means for monitoring the reaction product yields from said reactor and the coke deposited on said catalyst whereby the performance of said catalyst in a larger continuously operated catalytic cracking process is assessed in said laboratory scale reactor operated cyclically; and means for monitoring the concentration of CO and $CO_2$ in said reactors during said regeneration intervals by control of a computer;

means for periodically recording the monitored values of CO and $CO_2$; and means for increasing the frequency of said monitoring and recording as the concentration of CO and $CO_2$ increases in said reactor.

2. The apparatus recited in claim 1 wherein said means for controlling includes a digital computer which turns said means for supplying air on and off in cyclic intervals and turns said means for supplying hydrocarbons on and off in successive cyclic intervals.

3. The apparatus recited in claim 1 further comprising:

means for comparing said concentrations of CO and $CO_2$ to a prescribed limiting value; and means responsive to said concentrations falling below said prescribed limiting value for terminating the regeneration of said catalyst and initiating a new cycle of catalytic cracking.

4. The apparatus recited in claim 1 further comprising:

a digital computer, said monitored values of CO and $CO_2$ in successive regeneration intervals being applied to said digital computer, said digital computer having means for summing the molecular carbon represented by said concentrations to determine the coke deposited on said catalyst.

5. The apparatus recited in claim 1 wherein said means for monitoring reaction products comprises:

liquid and gas traps; and a solenoid valve between said reactor and said traps, said valve being opened by said means for controlling during cracking intervals.

6. The apparatus recited in claim 1 further comprising:

a source of supplementary fluidizing gas for said reactor; and solenoid valves connected between said source of fluidizing gas and said reactor, and between said source of air and said reactor, said valves being operated by said means for controlling whereby fluidizing gas is supplied to said reactor during cracking intervals and air is supplied to said reactor during regeneration intervals.

7. The apparatus recited in claim 1 wherein said source of air is enriched with oxygen whereby said regeneration is performed more quickly.

8. The apparatus of claim 1 wherein said continuous catalytic cracking process is a cyclic entrained bed catalytic process.

9. The apparatus of claim 1 wherein said laboratory scale reactor has dimensions of no more than about 58 cm by 3.5 cm ID.

* * * * *

UNITED STATES PATENT AND TRADEMARK OFFICE
CERTIFICATE OF CORRECTION

PATENT NO. : 4,419,328
DATED : December 6, 1983
INVENTOR(S) : Dennis E. Walsh

It is certified that error appears in the above—identified patent and that said Letters Patent is hereby corrected as shown below:

Column 4, line 40, "650°F$^+$" should be -- 650°F$^-$ --.

Signed and Sealed this

Seventeenth Day of July 1984

[SEAL]

Attest:

GERALD J. MOSSINGHOFF

Attesting Officer   Commissioner of Patents and Trademarks